Dec. 16, 1952     W. F. DVORAK     2,621,409
COMPASS DEVICE
Filed Sept. 12, 1950
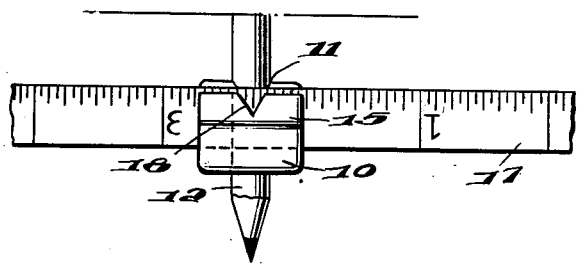
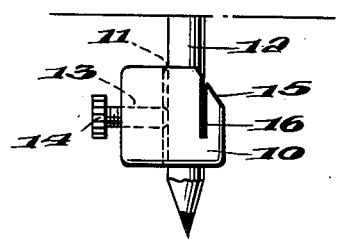
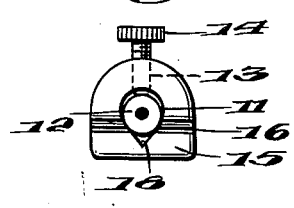 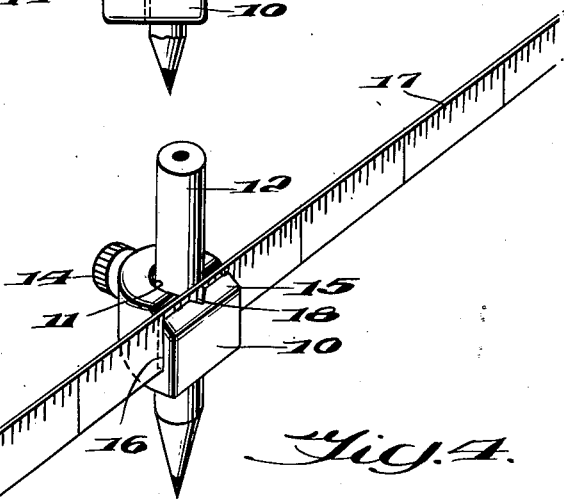
INVENTOR
WILLIAM F. DVORAK,
BY *Leech & Radue*
ATTORNEY Patented Dec. 16, 1952

2,621,409

UNITED STATES PATENT OFFICE 2,621,409

COMPASS DEVICE

William F. Dvorak, Venice, Calif.

Application September 12, 1950, Serial No. 184,410

2 Claims. (Cl. 33—27)

The present invention relates to an attachment to be used in combination with a measuring tape or the like for measuring and scribing of arcs or circles or the performing of other geometrical operations in which a compass might be used.

Heretofore many special types of compass constructions have been employed in various arts where it is necessary to draw large arcs, but most of these devices are complicated, cumbersome to operate and unhandy to carry about when not in use.

This invention has been devised to obviate these difficulties without sacrificing anything in the way of accuracy of operation or economy of manufacture.

Broadly stated, the object of this invention is to furnish a very practical and efficient means for drawing large circles and arcs, and at the same time to achieve the ultimate in simplicity of construction and operation.

Another object of this invention is to provide an improved attachment of the character indicated, which is convenient for use in various fields for accurately defining arcs and circles or similar geometrical operations over a wide range of radii, these radii being limited only by the length of the measuring tape used, and which, when not in use, may be compactly stored.

Additional objects will appear from the following detailed description of the preferred embodiment of this invention.

Reference is made to the drawing in which:

Fig. 1 is a front elevation of the attachment showing a measuring tape and marker assembled therewith;

Fig. 2 is an end elevation of Fig. 1;

Fig. 3 is a top plan view of the attachment alone; and

Fig. 4 is a general arrangement showing the attachment, tape and marker as they will be used in drawing arcs and circles.

The device embodying the present invention, as illustrated in the drawings, includes a block member 10 formed of suitable material to the general shape shown. A vertical hole 11 extends completely therethrough and is adapted to receive a marking member 12 such as a pencil or stylus. A threaded hole 13 extends through the rear portion of block 10, intersects hole 11 at right angles and is adapted to receive clamp screw 14 having a knurled head. Extending vertically through the block for a distance slightly more than the width of a steel tape and intersecting the hole 11 as a chord near its front side is slot 16 for receiving the tape 17. The front upper corner of the block is chamfered as at 15 with the upper edge of this section below the top horizontal plane of the body 10 so as to expose the graduated edge of the tape as shown in Fig. 1 and this edge is centrally notched as an index.

Index notch 18 is so positioned in relation to the marker receiving hole 11 that a plane normal to the measuring tape and passing through the point of the marker will intersect said index so as to insure accurate setting of the attachment.

Fig. 4 shows the attachment as it would be used in conjunction with an ordinary measuring tape for drawing circles or arcs. In assembling this equipment for operation, the marker 12 is inserted in hole 11 and the measuring tape 17 is then placed in slot 16, the marker and tape being frictionally held in position by the screw 14 which clamps the marker 12 into contact with the tape, forcing it into engagement with the outer side of slot 16 without kinking or damaging it.

In operation, measuring tape 17 with attachment and marker assembled thereon has its zero end pivotally secured by a pin or nail 19 at the center of the desired arc. The required radius is measured on the tape with the aid of index 18 and then screw 14 is tightened so as to hold the marker and tape in position as previously discussed. The arc or circle is then drawn by merely swinging the attachment about the pivot pin so that the marker contacts the surface on which the arc or circle is to be drawn.

When the drawing operations have been completed and it is desired that the equipment be stored, the screw 14 is loosened, thereby releasing marker 12 and tape 17, both of which are then removed from the block. The pivot pin 19 is removed, the tape rewound and the equipment is ready for storing. All parts can very well be carried in an ordinary garment pocket when so disassembled.

Obviously, a scriber may be used as a marker when working with sheet metal or other materials necessitating it. However, a common pencil will generally satisfactorily serve as a marker.

While the preferred embodiment of this invention has been fully disclosed, it is to be understood that various changes may be made without departing from the invention claimed.

What I claim as new and desire to secure by Letters Patent is:

1. An attachment for use with a measuring tape for drawing arcs or circles comprising in combination, a block having a receiving hole for a marker, said hole being generally cylindrical and of a diameter at least equal to the marker diameter plus the tape thickness, said block having a threaded holde intersecting said marker receiving hole, a screw threaded in said intersecting hole, said block having a slot normal to the threaded hole and intersecting the marker receiving hole as a chord opposite to said threaded hole and adapted to receive said measuring tape, said screw serving to force the marker against the tape to deflect it into that portion of the marker hole in the body portion on the remote side of the slot from the screw.

2. The combination as recited in claim 1 in which the body portion on the remote side of the slot from the screw has its upper face inclined toward the upper edge of the tape, the upper end of this inclined surface being below the top horizontal plane of the body so that the scale markings on the tape are visible throughout the entire width of the inclined surface, said inclined surface having a centrally positioned V-shaped index.

WILLIAM F. DVORAK.

REFERENCES CITED

The following references are of record in the file of this patent:

UNITED STATES PATENTS

| Number | Name | Date |
|---|---|---|
| 874,158 | Bovard | Dec. 17, 1907 |
| 1,254,986 | Condon et al. | Jan. 29, 1918 |
| 1,619,750 | Nelson | Mar. 1, 1927 |
| 2,396,877 | Peterson | Mar. 19, 1946 |
| 2,433,935 | Todd | Jan. 6, 1948 |

FOREIGN PATENTS

| Number | Country | Date |
|---|---|---|
| 831,503 | France | June 7, 1938 |